US008094932B2

(12) United States Patent
Kien et al.

(10) Patent No.: US 8,094,932 B2
(45) Date of Patent: Jan. 10, 2012

(54) COLOR IMAGE CORRECTING APPARATUS AND COLOR IMAGE CORRECTING METHOD IN WHICH THE AVERAGED HIGH FREQUENCY IMAGE IS SUPERIMPOSED ON THE LOW FREQUENCY IMAGE

(75) Inventors: Loi Yew Kien, Singapore (SG); Ang Hwee San, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 908 days.

(21) Appl. No.: 11/948,074

(22) Filed: Nov. 30, 2007

(65) Prior Publication Data

US 2008/0144930 A1 Jun. 19, 2008

(30) Foreign Application Priority Data

Nov. 30, 2006 (JP) ................................. 2006-324720

(51) Int. Cl.
*G06K 9/00* (2006.01)
*G03F 3/08* (2006.01)
(52) U.S. Cl. ........................................ 382/167; 358/521
(58) Field of Classification Search .................. 382/167, 382/263, 264, 266, 274, 275; 358/518–523
See application file for complete search history.

(56) References Cited

U.S. PATENT DOCUMENTS

| 2,580,685 | A | * | 1/1952 | Mathes | 348/437.1 |
| 5,661,522 | A | * | 8/1997 | Tomizuka | 348/262 |
| 2002/0050556 | A1 | * | 5/2002 | Nagashima | 250/208.1 |
| 2004/0028271 | A1 | * | 2/2004 | Pollard et al. | 382/162 |
| 2005/0078224 | A1 | * | 4/2005 | Ikeda | 348/712 |
| 2007/0223041 | A1 | * | 9/2007 | Hsieh et al. | 358/3.01 |

FOREIGN PATENT DOCUMENTS

| JP | 6-311307 A | 11/1994 |
| JP | 2001-257883 A | 9/2001 |
| JP | 2002-135591 A | 5/2002 |
| JP | 2004-74793 A | 3/2004 |

OTHER PUBLICATIONS

English translation of JP 09-200785.*

* cited by examiner

*Primary Examiner* — Yubin Hung
(74) *Attorney, Agent, or Firm* — Sughrue Mion, PLLC (57) ABSTRACT

A color image correcting apparatus includes: a high frequency image generating unit, generating a high frequency image having a high frequency component extracted from a color original image, represented by pixel values of a plurality of channels, for each channel; an average high frequency image generating unit, generating an average high frequency image by assigning an average pixel value, obtained by averaging pixel values of pixels of the channels of the high frequency image in the same coordinate, as pixel values for the channels in the same coordinate, respectively; a low frequency image output unit, generating a low frequency image having a low frequency component extracted from the original image; and a correction image generating unit, generating a corrected image of the original image by superposing the average high frequency image on the low frequency image.

7 Claims, 11 Drawing Sheets

| a | | | | b | |
|---|---|---|---|---|---|
| R | a_R | R | 0 | R | 0 |

| | | c | | | |
|---|---|---|---|---|---|
| R | 0 | R | 0 | R | 0 |

| d | | | | e | |
|---|---|---|---|---|---|
| R | d_R | R | 0 | R | e_R |

FIG. 6B

| a | | | | b | |
|---|---|---|---|---|---|
| G | 0 | G | 0 | G | b_G |

| | | c | | | |
|---|---|---|---|---|---|
| G | 0 | G | 0 | G | 0 |

| d | | | | e | |
|---|---|---|---|---|---|
| G | d_G | G | 0 | G | e_G |

FIG. 6C

| a | | | | b | |
|---|---|---|---|---|---|
| B | 0 | B | 0 | B | 0 |

| | | c | | | |
|---|---|---|---|---|---|
| B | 0 | B | c_B | B | 0 |

| d | | | | e | |
|---|---|---|---|---|---|
| B | 0 | B | 0 | B | e_B |

FIG. 6D a
| R | a_R/3 |
|---|---|
| G | a_R/3 |
| B | a_R/3 |

| | 0 |
|---|---|
| | 0 |
| | 0 | b
| R | b_G/3 |
|---|---|
| G | b_G/3 |
| B | b_G/3 |

| | 0 |
|---|---|
| | 0 |
| | 0 | c
| R | c_B/3 |
|---|---|
| G | c_B/3 |
| B | c_B/3 |

| | 0 |
|---|---|
| | 0 |
| | 0 | d
| R | (d_R+d_G)/3 |
|---|---|
| G | (d_R+d_G)/3 |
| B | (d_R+d_G)/3 |

| | 0 |
|---|---|
| | 0 |
| | 0 | e
| R | (e_R+e_G+e_B)/3 |
|---|---|
| G | (e_R+e_G+e_B)/3 |
| B | (e_R+e_G+e_B)/3 |

| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |

FIG. 10B

| −1 | −1 | −1 |
|---|---|---|
| −1 | 9 | −1 |
| −1 | −1 | −1 |

| g_R |
| g_G |
| g_B | b
| R | g_R + b_G/3 |
| G | g_G + b_G/3 |
| B | g_B + b_G/3 |

| g_R |
| g_G |
| g_B | c
| R | g_R + c_B/3 |
| G | g_G + c_B/3 |
| B | g_B + c_B/3 |

| g_R |
| g_G |
| g_B | d
| R | g_R + (d_R+d_G)/3 |
| G | g_G + (d_R+d_G)/3 |
| B | g_B + (d_R+d_G)/3 |

| g_R |
| g_G |
| g_B | e
| R | g_R + (e_R+e_G+e_B)/3 |
| G | g_G + (e_R+e_G+e_B)/3 |
| B | g_B + (e_R+e_G+e_B)/3 |

COLOR IMAGE CORRECTING APPARATUS AND COLOR IMAGE CORRECTING METHOD IN WHICH THE AVERAGED HIGH FREQUENCY IMAGE IS SUPERIMPOSED ON THE LOW FREQUENCY IMAGE

BACKGROUND

1. Technical Field

The present invention relates to a color image correcting apparatus and a color image correcting method. More specifically, the present invention relates to a color image correcting apparatus and a color image correcting method, which are capable of generating a corrected image of an original image by superposing an average high frequency image of an original image on a low frequency image of the original image.

2. Related Art

Among image forming apparatuses for irradiating a manuscript with light and receiving transmitted light or reflected light by means of a CCD or the like for formation of an image, there is a related image forming apparatuses for removing noises from images (for example, see JP-A-06-311307). The related image forming apparatus disclosed in JP-A-06-311307 captures a plurality of images of a manuscript by irradiating the manuscript with light in a plurality of directions different from each other, compares the captured images with each other, and produces an image based on the comparison result, thereby removing noises, which may occur due to unevenness of the manuscript or a manuscript table for holding the manuscript.

However, the related image forming apparatus disclosed in JP-A-06-311307 has a problem in that it takes a long time to remove noises from the image of the manuscript since the manuscript is captured a plurality of times to find the noises. In addition, this apparatus has also a problem of alignment of the plurality of captured images of the manuscript with high precision. In addition, there has been proposed a method of removing noises randomly appearing in a pixel of an image by smoothing the noises with pixels surrounding the pixel. However, this method has also a problem of smoothing the image itself as well as the random noises.

SUMMARY

In order to solve the above-mentioned objects, according to an aspect of the invention, there is provided a color image correcting apparatus, comprising:

a high frequency image generating unit, generating a high frequency image having a high frequency component extracted from a color original image, represented by pixel values of a plurality of channels, for each channel;

an average high frequency image generating unit, generating an average high frequency image by assigning an average pixel value, obtained by averaging pixel values of pixels of the channels of the high frequency image in the same coordinate, as pixel values for the channels in the same coordinate, respectively;

a low frequency image output unit, generating a low frequency image having a low frequency component extracted from the original image; and a correction image generating unit, generating a corrected image of the original image by superposing the average high frequency image on the low frequency image.

The present disclosure relates to the subject matter contained in Japanese patent application No. 2006-324720 filed on Nov. 30, 2006, which is expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the present invention will be described through embodiments which are not intended to limit the scope of the invention which is set forth in the claims. All of combinations of features described in the embodiments are not essential to the means for solving the problems.

Figure 1:
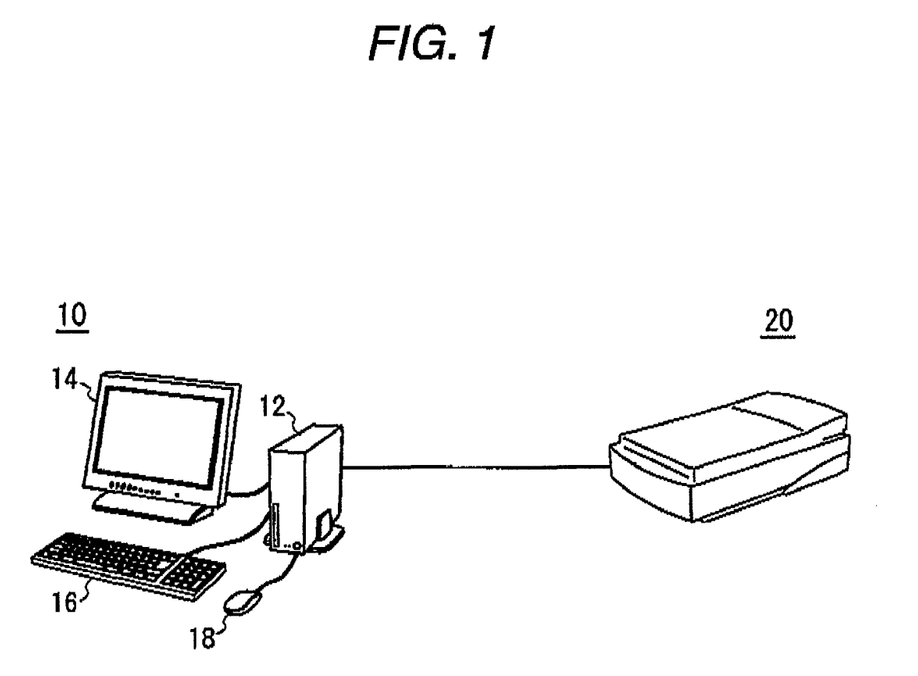
FIG. 1 is a perspective view of an example of a personal computer.

As shown in FIG. 1, the personal computer 10 includes a main body 12, a display unit 14 that displays an image to a user based on an output from the main body 12, and a keyboard 16 and a mouse 18 as examples of input units through which the user inputs data to the main body 12. The personal computer 10 is connected to a scanner 20 through various interfaces. The scanner 20 outputs a read image to the personal computer 10.

Figure 2:
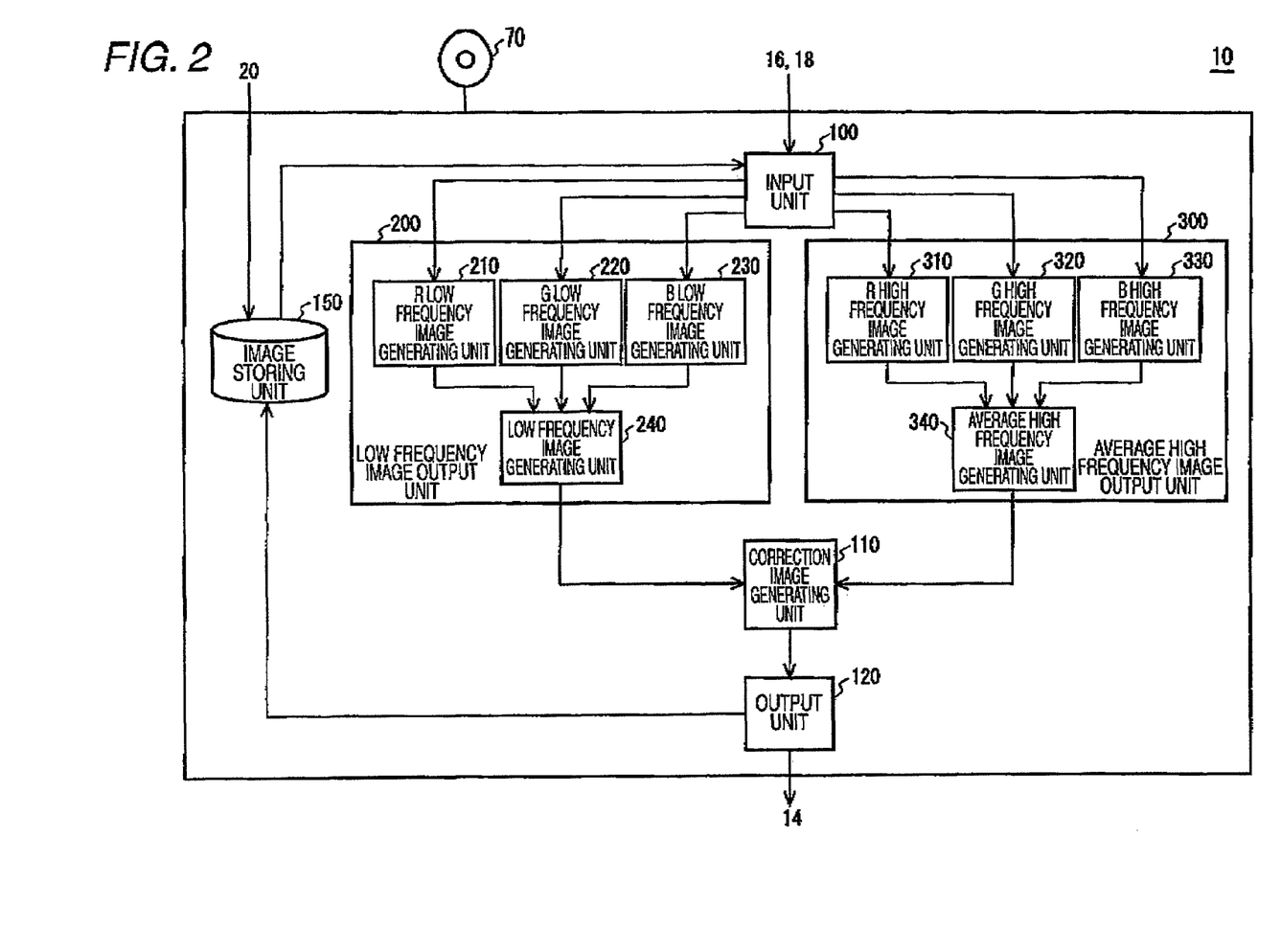
FIG. 2 shows an example of a block diagram of the personal computer.

As shown in FIG. 2, the personal computer 10 includes an input unit 100, a correction image generating unit 110, an output unit 120, an image storing unit 150, a low frequency image output unit 200, and an average high frequency image output unit 300. The low frequency image output unit 200 includes an R low frequency image generating unit 210, a G low frequency image generating unit 220, a B low frequency image generating unit 230 and a low frequency image generating unit 240. The average high frequency image output unit 300 includes an R high frequency image generating unit 310, a G high frequency image generating unit 320, a B high frequency image generating unit 330 and an average high frequency image generating unit 340.

The image storing unit 150 stores an image. For example, the image storing unit 150 stores an image read by the scanner 20. The input unit 100 receives an input from a user through the keyboard 16 and the mouse 18. Based on the input received from the user, the input unit 100 reads out the image stored in the image storing unit 150. The input unit 100 transfers the read image (hereinafter referred to as an original image) to the low frequency image output unit 200 and the average high frequency image output unit 300. The original image has pixel values of channels of additive mixture of three primary colors, i.e., red (R), green (G) and blue (B).

The R low frequency image generating unit 210 generates an R low frequency image by extracting an R channel low frequency component from the original image. Likely, the G low frequency image generating unit 220 generates a G low frequency image by extracting a G channel low frequency component from the original image, and the B low frequency image generating unit 230 generates a B low frequency image by extracting a B channel low frequency component from the original image.

The low frequency image generating unit 240 generates a low frequency image having a low frequency component extracted from the original image by setting pixel values of the generated R low frequency image, G low frequency image and B low frequency image in the same coordinate to be pixel values for R channel, G channel and B channel in the coordinate, respectively.

The R high frequency image generating unit 310 generates an R high frequency image by extracting an R channel high frequency component from the original image. Likely, the G high frequency image generating unit 320 generates a G high frequency image by extracting a G channel high frequency component from the original image, and the B high frequency image generating unit 330 generates a B high frequency image by extracting a B channel high frequency component from the original image.

The average high frequency image generating unit 340 generates and outputs an image (hereinafter referred to as an average high frequency image) in which an average of pixel values of pixels of the R high frequency image, G high frequency image and B high frequency image in the same coordinate is set to be a pixel value for each of R channel, G channel and B channel in the coordinate.

The correction image generating unit 110 generates a corrected image of the original image by superposing the average high frequency image generated by the average high frequency image generating unit 340 on the low frequency image generated by the low frequency image generating unit 240.

The output unit 120 displays the original image stored in the image storing unit 150 or the corrected image generated by the correction image generating unit 110 on the display unit 14. The output unit 120 may store the corrected image generated by the correction image generating unit 110 in the image storing unit 150.

A storage medium 70 stores a program that causes the input unit 100, the correction image generating unit 110, the output unit 120, the image storing unit 150, the low frequency image output unit 200 and the average high frequency image output unit 300 to operate. The personal computer 10 may cause the average high frequency image output unit 300 and so on to operate by installing the program from the storage medium 70. Alternatively, the personal computer 10 may acquire such a program via a network.

Figure 3A:
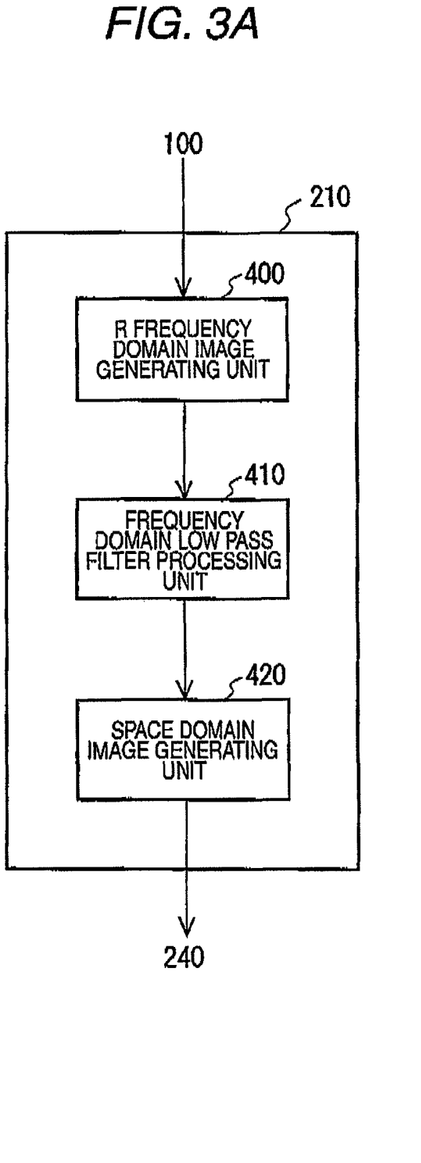
FIGS. 3A and 3B show examples of block diagrams of an R low frequency image generating unit and an R high frequency image generating unit, respectively.
Figure 3B:
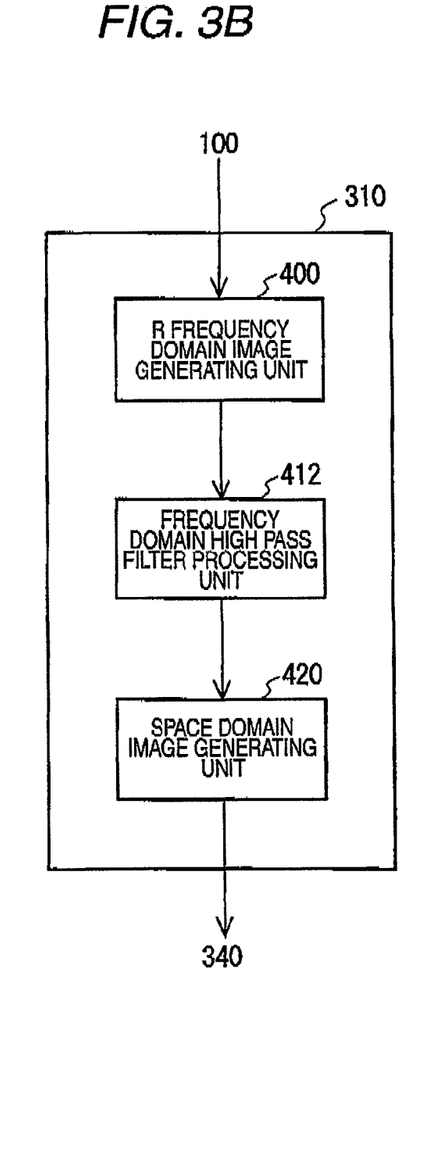

As shown in FIG. 3A, the R low frequency image generating unit 210 includes an R frequency domain image generating unit 400, a frequency domain low pass filter processing unit 410 and a space domain image generating unit 420. As shown in FIG. 3B, the R high frequency image generating unit 310 includes an R frequency domain image generating unit 400, a frequency domain high pass filter processing unit 412 and a space domain image generating unit 420.

The R frequency domain image generating unit 400 generates an image having a Fourier spectrum for an R channel of the original image (hereinafter referred to as a Fourier spectrum image) by subjecting the original image to a Fourier transformation for the R channel. The frequency domain low pass filer processing unit 410 generates a new Fourier spectrum image having only a low frequency component using a mask image for removing a high frequency component from the Fourier spectrum image generated in the R frequency domain image generating unit 400. The frequency domain high pass filer processing unit 412 generates a new Fourier spectrum image having only a high frequency component using a mask image for removing a low frequency component from the Fourier spectrum image generated in the R frequency domain image generating unit 400. The space domain image generating unit 420 generates a space domain image having only a low frequency component or a high frequency component from the Fourier spectrum image having only the low frequency component or the high frequency component by subjecting the Fourier spectrum image to an inverse Fourier transformation. The G low frequency image generating unit 220 and the B low frequency image generating unit 230 operate in the same way as the R low frequency image generating unit 210, and the G high frequency image generating unit 320 and the B high frequency image generating unit 330 operate in the same way as the R high frequency image generating unit 310.

Figure 4:
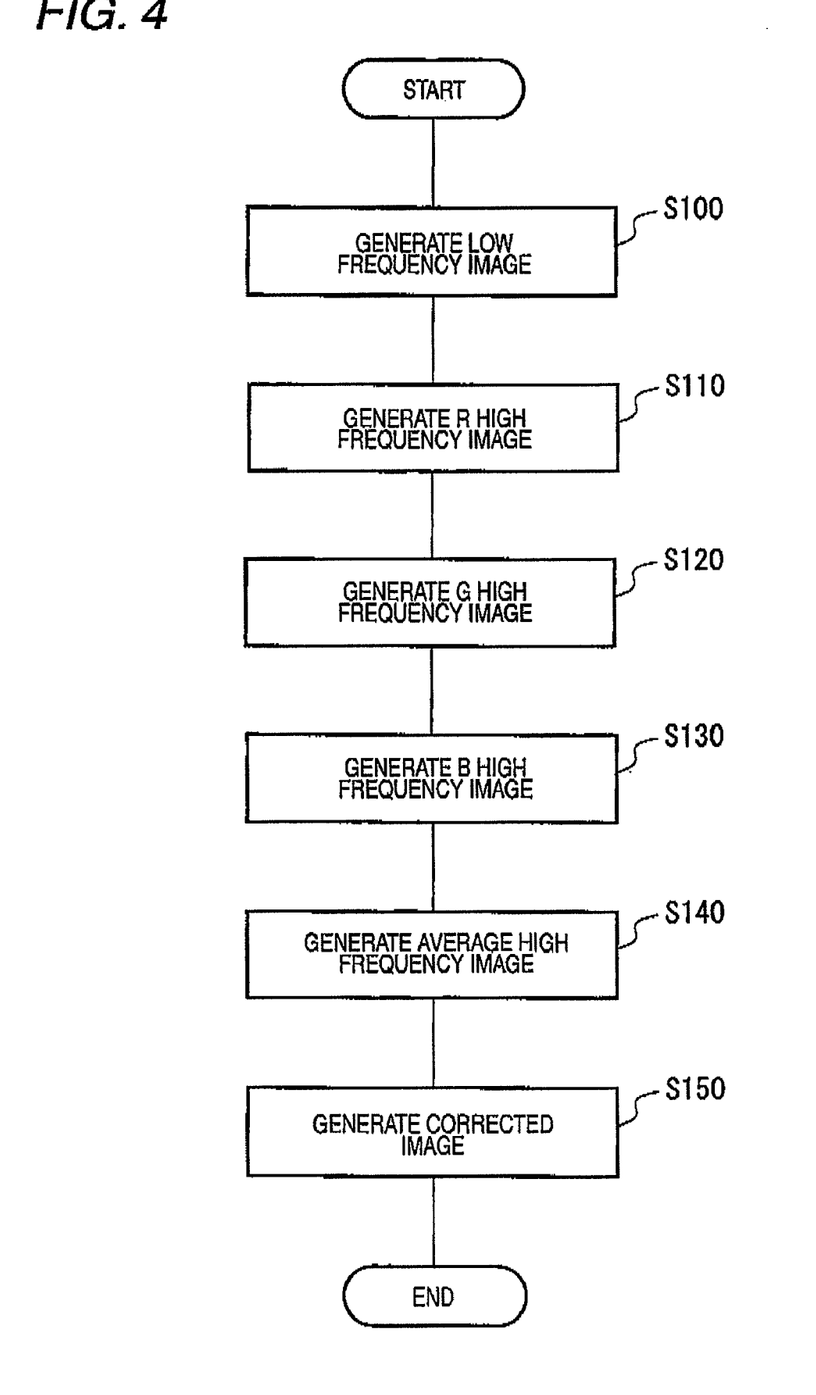
FIG. 4 is a flow chart illustrating an example of operation of the personal computer.
Figure 5:
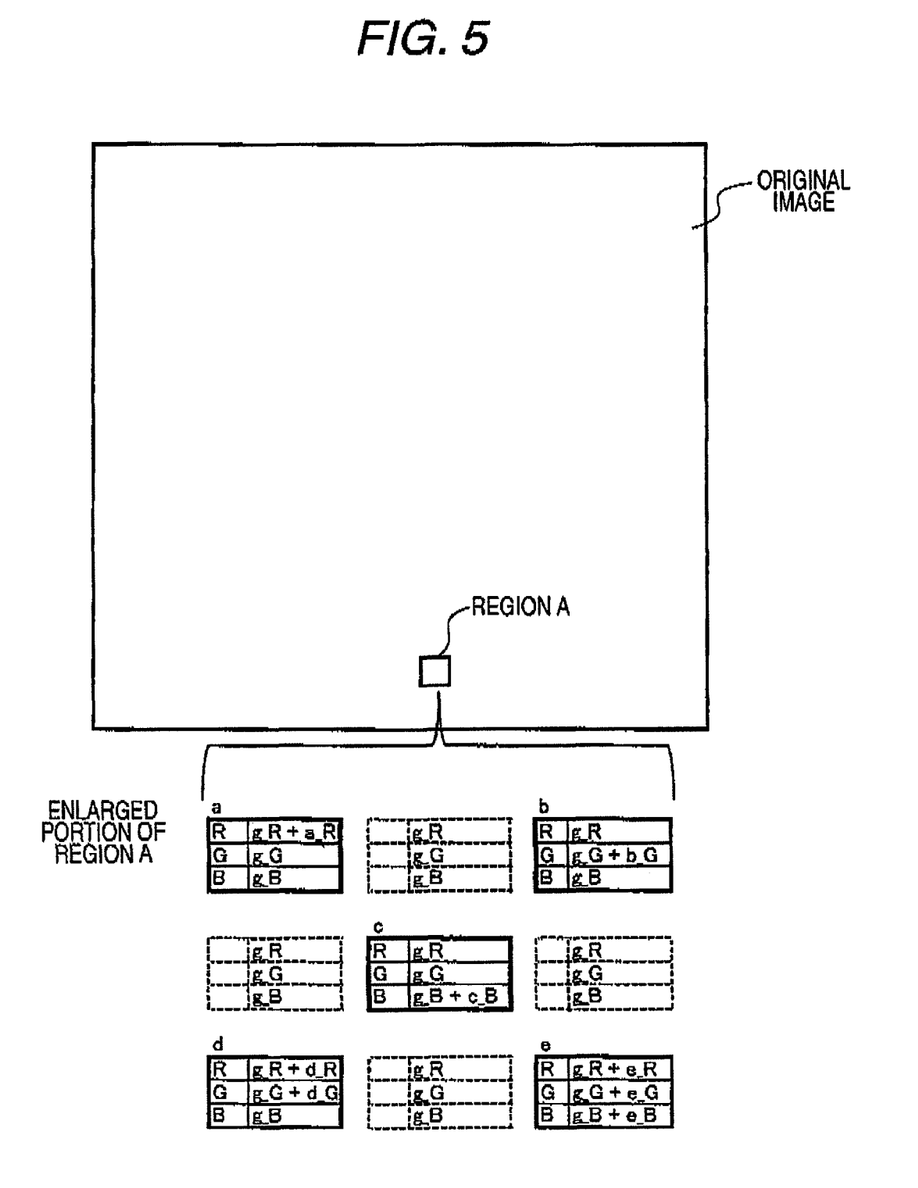
FIG. 5 shows an example of an original image stored in an image storing unit.

The flow chart shown in FIG. 4 starts when the input unit 100 receives an instruction to read the original image stored in the image storing unit 150. Here, it is assumed that the input unit 100 receives an instruction to read the color original image shown in FIG. 5.

The read original image contains red, green and blue random noises in pixels a, b and c of a region A shown in FIGS. 6A to 6D, respectively. In addition, red and green random noises are superposed each other in a pixel d of the region A, and red, green and blue random noises are superposed one another in a pixel e of the region A. In an enlarged portion of the region A shown in FIG. 5, characters in three stages indicate R, G and B pixel values, respectively. For example, the pixel a indicates that R, G and B have pixel values of "g_R+a_R", "g_G" and "g_B".

Figure 11:
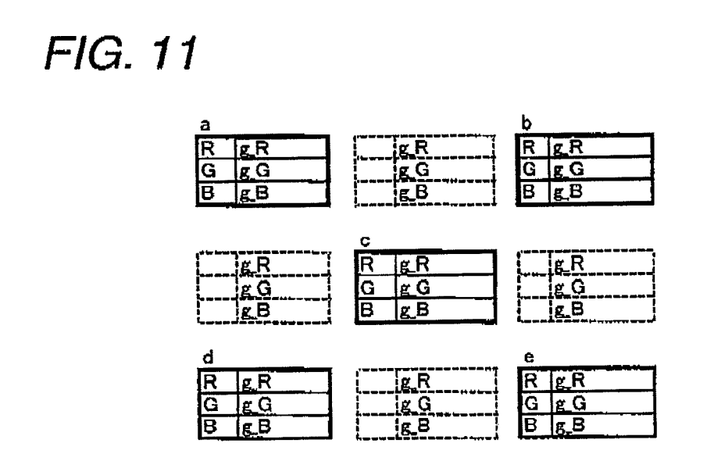
FIG. 11 shows an example of a low frequency average image space.

First, the input unit 100 transfers the original image to the low frequency image output unit 200 and the average high frequency image output unit 300. The low frequency image output unit 200 generates a low frequency image having a low frequency component extracted from the acquired original image (S100). In the region A shown in FIG. 5, although it is shown that 9 pixels in the region A have a pixel value "g_R" for the same R channel, a pixel value "g_G" for the same G channel, and a pixel value "g_B" for the same B channel as shown in FIG. 11, these pixel values may be different.

The R high frequency image generating unit 310 generates an R high frequency image from the acquired original image (S110). The R high frequency image generated in the R high frequency image generating unit 310 is extracted with the pixels a, d and e as high frequency components, for example, as indicated by bold lines in FIG. 6A, and pixel values for the R channel of the R high frequency image are calculated as "a_R", "d_R" and "e_R".

The G high frequency image generating unit 320 generates a G high frequency image from the acquired original image (S120). The G high frequency image generated in the G high frequency image generating unit 320 is extracted with the pixels b, d and e as high frequency components, for example, as indicated by bold lines in FIG. 6B, and pixel values for the G channel of the G high frequency image are calculated as "b_G", "d_G" and "e_G".

The B high frequency image generating unit 330 generates a B high frequency image from the acquired original image (S130). The B high frequency image generated in the B high frequency image generating unit 330 is extracted with the pixels c and e as high frequency components, for example, as indicated by bold lines in FIG. 6C, and pixel values for the B channel of the B high frequency image are calculated as "c_B" and "e_B".

Figure 6A:
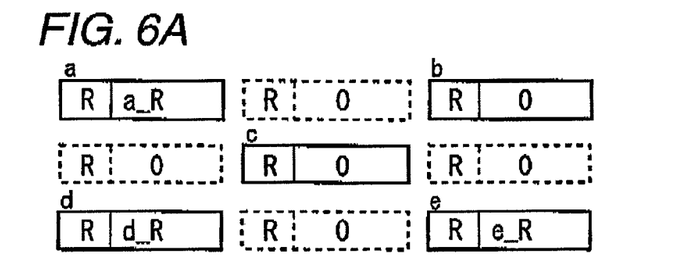
FIGS. 6A to 6D show a region in an R high frequency image, a G high frequency image, a B high frequency image and an average high frequency image, respectively.
Figure 6B:
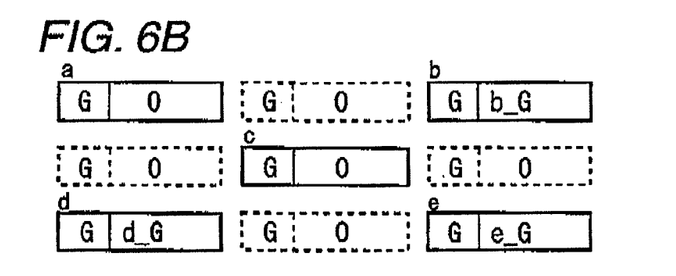
Figure 6C:
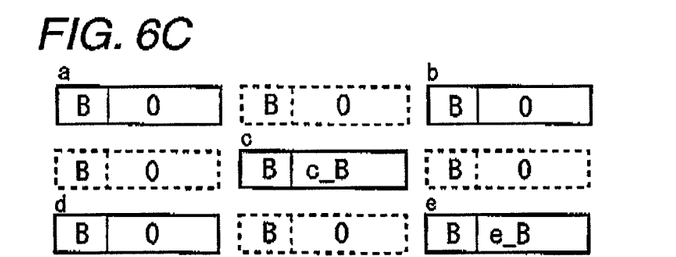
Figure 6D:
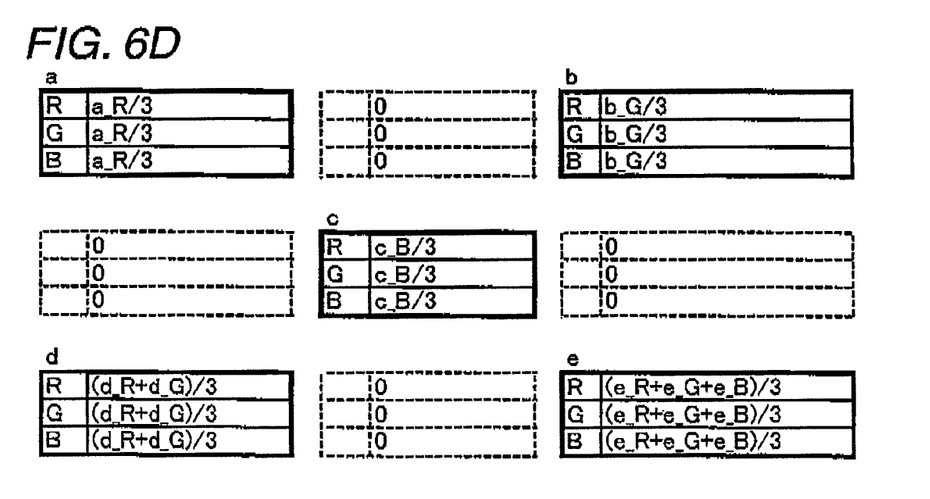

The average high frequency image generating unit 340 generates an average high frequency image by setting an average pixel value of pixels for the R high frequency image, the G high frequency image and the B high frequency image in the same coordinate to be a pixel value for an R channel, a G channel and a B channel in the same coordinate (S140). For example, as shown in FIG. 6D, a pixel value "a_R/3" obtained by averaging pixel values "a_R", "0" and "0" for the pixels a of the R high frequency image, the G high frequency image and the B high frequency image is assigned as pixel values "a_R/3", "a_R/3" and "a_R/3" for the R channel, the G channel and the B channel, respectively, of the pixel a of the average high frequency image.

The correction image generating unit 110 generates a corrected image of the original image by superposing the average high frequency image generated by the average high frequency image generating unit 340 on the low frequency image generated by the low frequency image output unit 200 (S150). In this case, the correction image generating unit 110 sets a resultant pixel value, which is obtained by superposing a pixel value of a corresponding pixel in the average high frequency image on a pixel value of the R channel at a specified position in the low frequency image, to be a new pixel value of the R channel at the same position. Similarly, the correction image generating unit 110 sets resultant pixel values, which are obtained by superposing the pixel value of corresponding pixels in the average high frequency image on pixel values of the G channel and the B channel, respectively, at specified positions in the low frequency image, to be new pixel values of the G channel and the B channel at the same positions, respectively. In this case, the correction image generating unit 110 may acquire an original image or a low frequency image from the outside by referring to the input unit 100 and generate a corrected image of the acquired image. Then, the flow chart ends.

Figure 12:
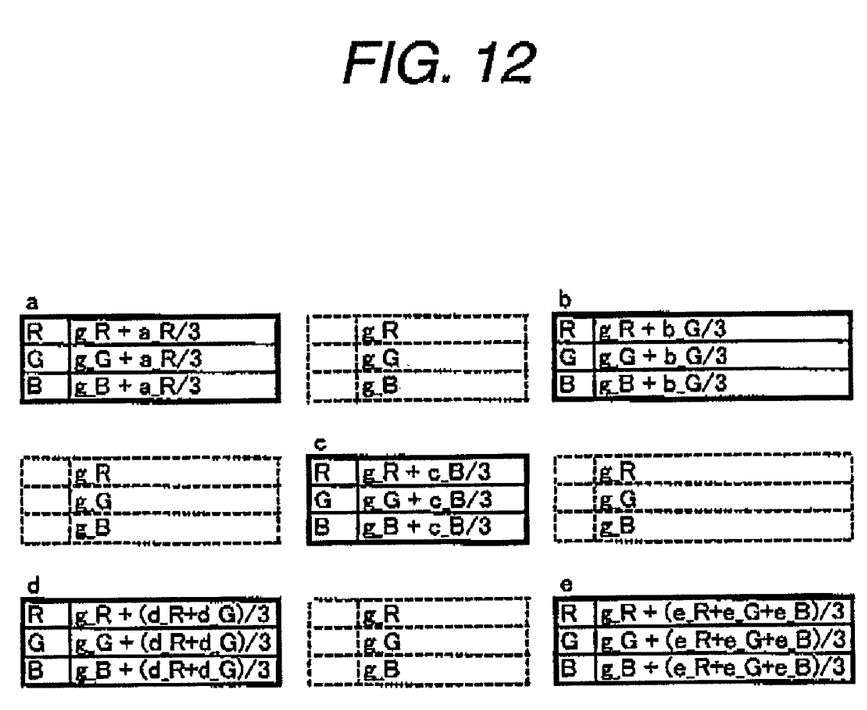
FIG. 12 shows an example of a corrected image.

FIG. 12 shows pixel values of pixels after correction of the region A. In the step S150, as shown in FIG. 12, for example, for the pixel a, the correction image generating unit 110 superposes the R, G and B pixel values "a_R/3", "a_R/3" and "a_R/3" of corresponding pixels in the average high frequency image on pixel values "g_R", "g_G" and "g_B" of respective R, G and B channels at specified positions in the low frequency image. Accordingly, for the pixel a, the correction image generating unit 110 generates a corrected image with R, G and B pixel values "g_R+a_R/3", "g_G+a_R/3" and "g_B+a_R/3" after correction.

This allows chromatic random noises to be achromatized, i.e., removed. In particular, primary red, green and blue random noises included in the original image may be inconspicuous. In addition, red, green and blue random noises may be removed from an image captured once.

Figure 7:
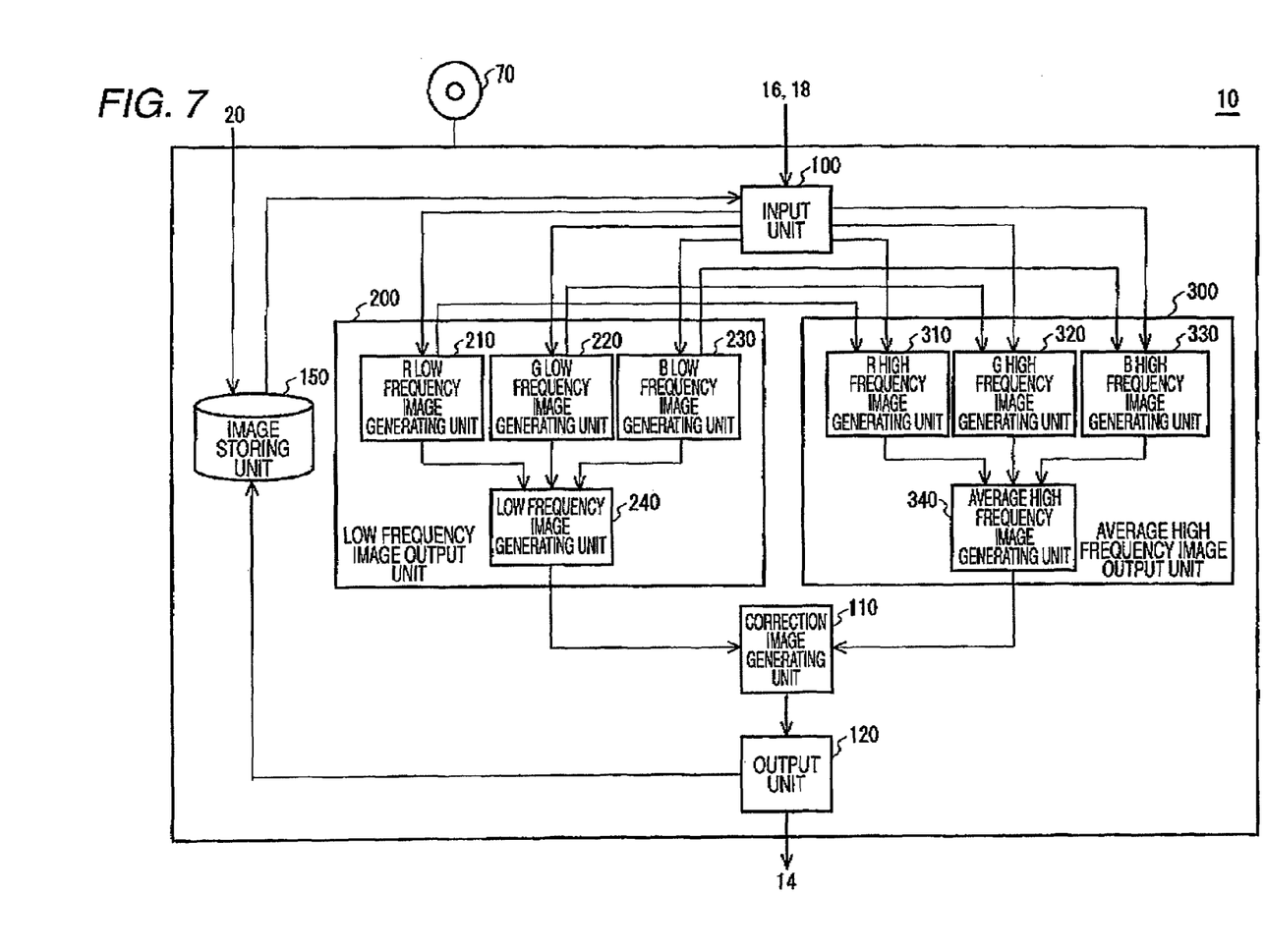
FIG. 7 shows another example of a block diagram of the personal computer.
Figure 8A:
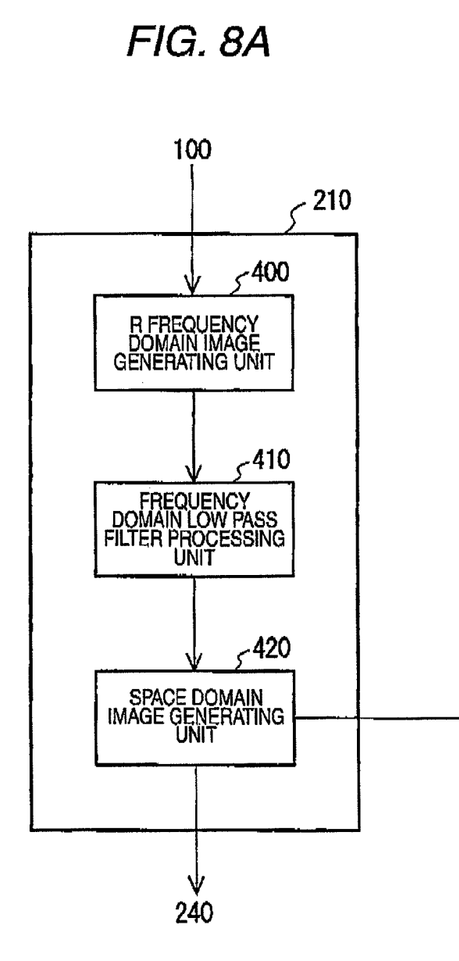
FIGS. 8A and 8B show another examples of block diagrams of the R low frequency image generating unit and the R high frequency image generating unit, respectively.
Figure 8B:
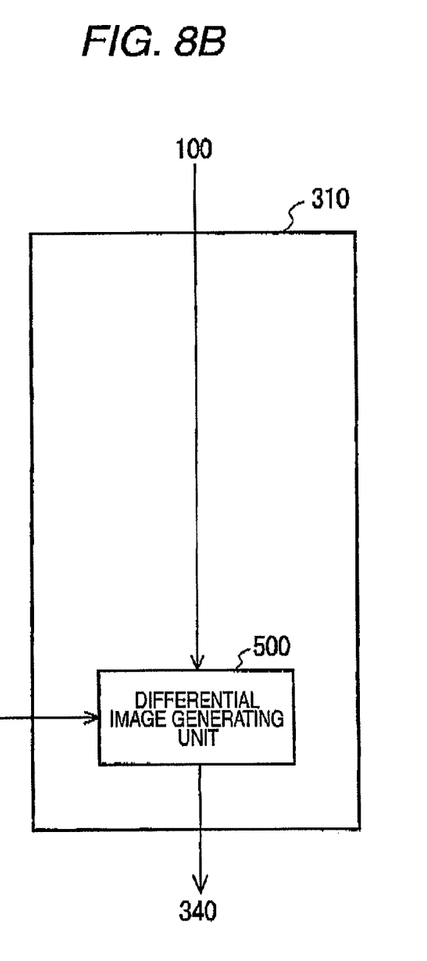

As shown in FIG. 7, the R high frequency image generating unit 310 may generate an R high frequency image by subtracting an R low frequency image generated by the R high frequency image generating unit 210 from an image of an R channel of an original image. That is, the R high frequency image generating unit 310 may include a differential image generating unit 500 as shown in FIG. 3B, instead of the R frequency domain image generating unit 400, the frequency domain high pass filter processing unit 412 and the space domain image generating unit 420 as shown in FIG. 3B. The differential image generating unit 500 may generate an R high frequency image by subtracting a Fourier spectrum image having a low frequency component for an R channel, which is generated by the space domain image generating unit 420, from an image of an R channel of an original image. Likely, the G high frequency image generating unit 320 may generate a G high frequency image by subtracting a G low frequency image generated by the G high frequency image generating unit 220 from an image of a G channel of the original image, and the B high frequency image generating unit 330 may generate a B high frequency image by subtracting a B low frequency image generated by the B high frequency image generating unit 230 from an image of a B channel of the original image. Accordingly, it is possible to generate a high frequency image using a low frequency image of each channel without separately providing a process for generating a low frequency image of each channel and a process for generating a high frequency image of each channel.

Figure 9A:
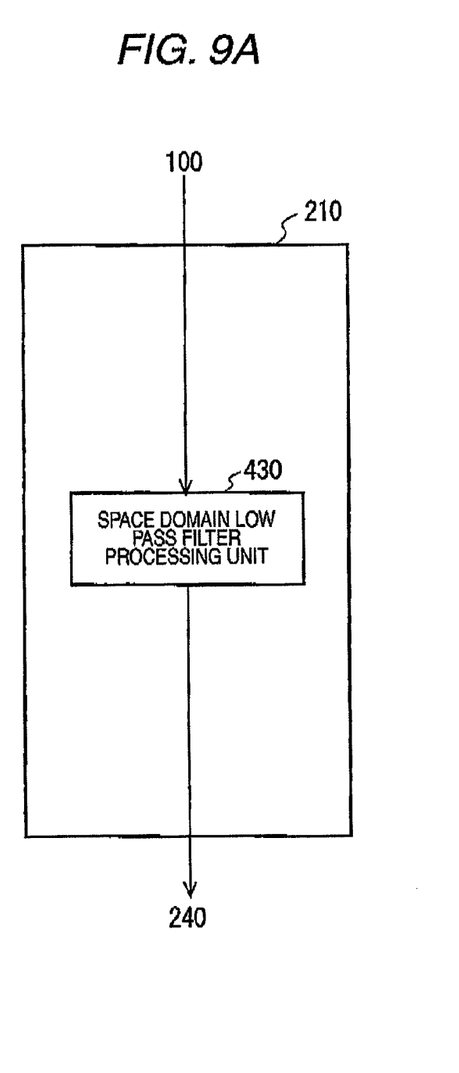
FIGS. 9A and 9B show another examples of block diagrams of the R low frequency image generating unit and the R high frequency image generating unit, respectively.
Figure 10A:
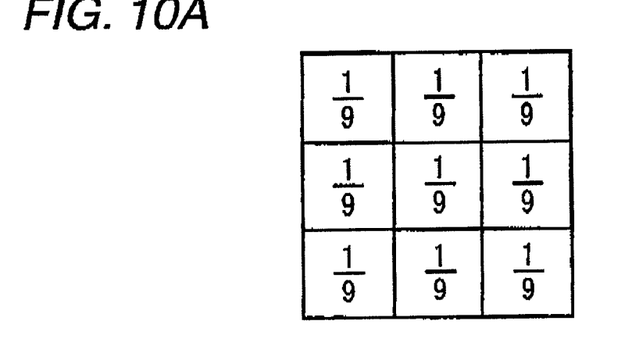
FIGS. 10A and 10B show examples of a filter for spatial filtering.

The R low frequency image generating unit 210 may include a space domain low pass filter processing unit 430 as shown in FIG. 9A, instead of the R frequency domain image generating unit 400, the frequency domain low pass filter processing unit 410 and the space domain image generating unit 420 as shown in FIG. 3A. The space domain low pass filter processing unit 430 generates an R low frequency image using, for example, a linear filter as shown in FIG. 10A. This may be similarly applied to the G low frequency image generating unit 220 and the B low frequency image generating unit 230. Accordingly, it is possible to simply achromatize or move chromatic random noises.

Figure 9B:
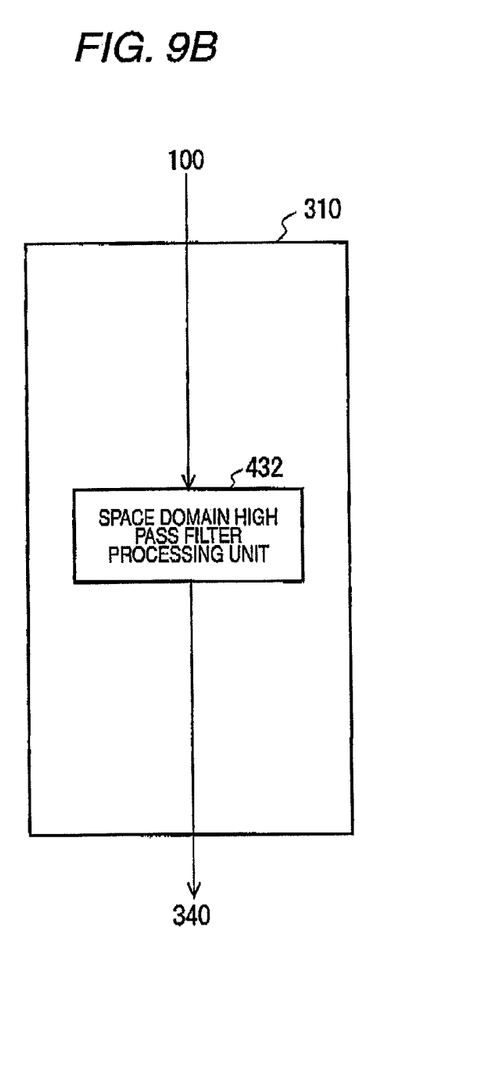
Figure 10B:
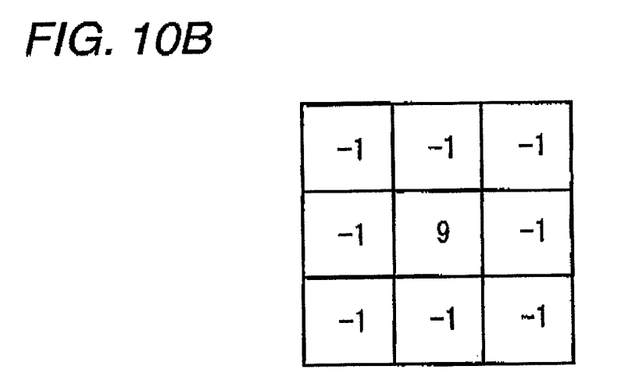

Likely, the R high frequency image generating unit 310 may include a space domain high pass filter processing unit 432 as shown in FIG. 9B, instead of the R frequency domain image generating unit 400, the frequency domain high pass filter processing unit 412 and the space domain image generating unit 420 as shown in FIG. 3B. The space domain high pass filter processing unit 432 generates an R high frequency image using, for example, a filter as shown in FIG. 10B. This may be similarly applied to the G high frequency image generating unit 320 and the B high frequency image generating unit 330.

As described above, according to the invention, it is possible to make chromatic random noises inconspicuous without smoothing an image itself. In addition, it is possible to achromatize or remove chromatic random noises. Accordingly, it is possible to make very troublesome primary chromatic random noises inconspicuous depending on a tone of a subject and a background. In addition, it is possible to remove red, green and blue random noises from an image captured once. This may make noises inconspicuous even at a small S/N ratio, thereby making it possible to shorten an exposure time of a CCD or the like. Accordingly, it is possible to read a manuscript at a high speed and the present invention can be used in an inexpensive optical system. In addition, the above described correction may be made during capture of an image or for a prepared image from the outside.

In addition, although the personal computer 10 includes the input unit 100, the correction image generating unit 110, the output unit 120, the image storing unit 150, the low frequency image output unit 200 and the average high frequency image output unit 300 in the above embodiments, the scanner 20 may instead include the correction image generating unit 110, the output unit 120, the image storing unit 150, the low frequency image output unit 200 and the average high frequency image output unit 300. In addition, the correction image generating unit 110, the output unit 120, the image storing unit 150, the low frequency image output unit 200 and the average high frequency image output unit 300 may be in the form of a program executable by a computer. This makes it possible to achromatize or remove chromatic random noises. In addition, it is possible to remove chromatic random noises by one-time image capture, not by multiple-times image capture.

In addition, although the average high frequency image output unit 300 calculates the average pixel value by arithmetically averaging pixel values for respective channels, the method of calculating the average pixel value is not limited to this. As another example, the average high frequency image output unit 300 may calculate the average pixel value by linear combination such as weight-averaging pixel values for respective channels. In addition, the method of calculating an average pixel value may be different for different channels with respect to a particular pixel.

In this case, if any of pixel values of high frequency image of each channel for the particular pixel is less than a threshold, the average high frequency image output unit 300 may use the corresponding pixel value, as it is, for the corresponding channel. For example, in the examples shown in FIGS. 5 to 6D, since the pixel values of the G high frequency image and the B high frequency image of the pixel a are "0", the average high frequency image output unit 300 may use these pixel values to assign pixel values of R, G and B channels of the average high frequency image for the pixel a as "a_R", "0" and "0". This can make chromatic random noises inconspicuous without smoothing an image itself.

In addition, in the above aspect, instead of using the corresponding pixel value, as it is, for the corresponding channel when any of pixel values of high frequency image of each channel for the particular pixel is less than the threshold, the average high frequency image output unit 300 may use the corresponding pixel value, as it is, for the corresponding channel when pixel values of high frequency image of two or more channels for the same pixel are more than the threshold.

In addition, although the image read by the scanner is corrected by the personal computer in the above embodiments, the subject for correction is not limited to the personal computer. As another example, the correction may be made in a digital camera that captures an image.

In addition, although it has been illustrated in the above embodiments that the color image having pixel values of R, G and B channels is corrected and output, the correction is not limited to this. As another example, in case where a gray image is generated from a read or captured image using the R, G and B channels the correction may be made before graying the read or captured image.

Although the present invention has been described by way of exemplary embodiments, the technical scope of the present invention is not limited to the above exemplary embodiments. It is obvious to those skilled in the art that the exemplary embodiments may be modified and improved in various ways. It is to be understood that such modification and improvement are also included in the technical scope of the invention when read throughout the annexed claims.

What is claimed is:

1. A color image correcting apparatus, comprising:
a high frequency image generating unit, which generates a high frequency image having a high frequency component extracted from a color original image which is represented by pixel values of a plurality of channels, for each channel;
an average high frequency image generating unit, which generates an average high frequency image by assigning an adjusted pixel value to each of the channels at each pixel location;
a low frequency image output unit, which generates a low frequency image having a low frequency component extracted from the original image;
a correction image generating unit, which generates a corrected image of the original image by superposing the average high frequency image on the low frequency image; and
wherein the average high frequency image generating unit determines, for each pixel location of the high frequency image, whether the pixel value of one of the channels of said each pixel location is less than a threshold, and
in a case where the pixel value of one of the channels of said each pixel location is less than a threshold, the average high frequency image output unit uses the pixel values of the channels of said each pixel location as the adjusted pixel values of the respective channels of said each pixel location; otherwise the average high frequency image output unit uses the average of the pixel values of the channels of said each pixel location as the adjusted pixel value of each of the channels of said pixel location.

2. The color image correcting apparatus according to claim 1, wherein
the original image is a color original image including pixel values of RGB channels, and
the high frequency image generating unit includes:
an R high frequency image generating unit, generating an R high frequency image having an R channel high frequency component extracted from the original image;
a G high frequency image generating unit, generating a G high frequency image having a G channel high frequency component extracted from the original image; and
a B high frequency image generating unit, generating a B high frequency image having a B channel high frequency component extracted from the original image.

3. The color image correcting apparatus according to claim 2, wherein
the low frequency image output unit includes:
an R low frequency image generating unit, generating an R low frequency image having an R channel low frequency component extracted from the original image;
a G low frequency image generating unit, generating a G low frequency image having a G channel low frequency component extracted from the original image;
a B low frequency image generating unit, generating a B low frequency image having a B channel low frequency component extracted from the original image; and
a low frequency image generating unit, generating the low frequency image by setting pixel values of pixels of the R low frequency image, the G low frequency image and the B low frequency image in the same coordinate, to be pixel values for the R channel, the G channel and the B channel in the same coordinate, respectively,
the R high frequency image generating unit generates the R high frequency image by subtracting the R low frequency image from the R channel of the original image, the G high frequency image generating unit generates the G high frequency image by subtracting the G low frequency image from the G channel of the original image, and the B high frequency image generating unit generates the B high frequency image by subtracting the B low frequency image from the B channel of the original image.

4. The color image correcting apparatus according to claim 1, wherein the average high frequency image generating unit calculates the average of the pixel values of the channels of said each pixel location by arithmetically averaging the pixel values of the channels of said each pixel location.

5. The color image correcting apparatus according to claim 1, wherein the average high frequency image generating unit calculates the average of the pixel values of the channels of said each pixel location by weight-averaging the pixel values of the channels of said each pixel location.

6. A color image correcting method, comprising:

generating a high frequency image having a high frequency component extracted from a color original image which is represented by pixel values of a plurality of channels, for each channel;

generating an average high frequency image by assigning an adjusted pixel value to each of the channels at each pixel location;

generating a low frequency image having a low frequency component extracted from the original image;

generating a corrected image of the original image by superposing the average high frequency image on the low frequency image; and wherein generating an average high frequency image comprises determining, for each pixel location of the high frequency image, whether the pixel value of one of the channels of said each pixel location is less than a threshold, and in a case where the pixel value of one of the channels of said each pixel location is less than a threshold, the pixel values of the channels of said each pixel location are used as the adjusted pixel values of the respective channels of said each pixel location; otherwise the average of the pixel values of the channels of said each pixel location are used as the adjusted pixel value of each of the channels of said pixel location.

7. A non-transitory computer-readable recording medium having recorded thereon a computer program which when executed by a computer causes the computer to execute the method according to claim 6.

\* \* \* \* \*